Aug. 26, 1958

H. C. REYNOLDS 2,848,916

FEED-THROUGH SOCKET

Filed Aug. 9, 1957

INVENTOR
HAROLD C. REYNOLDS
BY
HIS ATTORNEY

United States Patent Office 2,848,916
Patented Aug. 26, 1958

2,848,916
FEED-THROUGH SOCKET

Harold C. Reynolds, Athens, Pa., assignor to Ingersoll-Rand Company, New York, N. Y., a corporation of New Jersey Application August 9, 1957, Serial No. 677,288

5 Claims. (Cl. 81—121)

This invention relates to a feed-through socket for nuts, bolts and the like.

One object of the invention is to provide a feed-through socket of this type in which guide means are provided to insure that the nut or other element to be rotated by the socket, will be fed through the socket without danger of binding therein.

Figure 1:
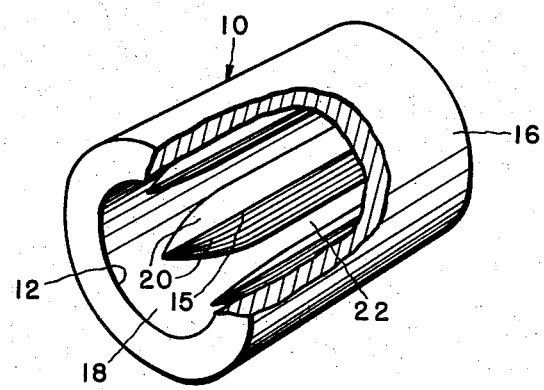
Figure 2:
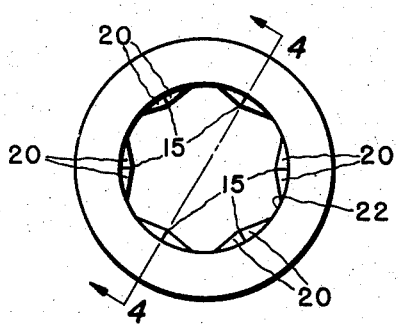
Figure 3:
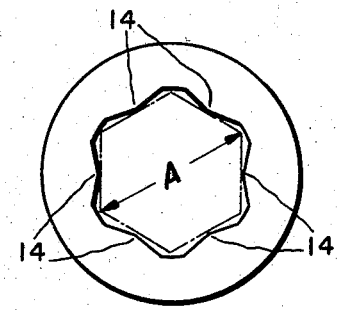
Figure 5:
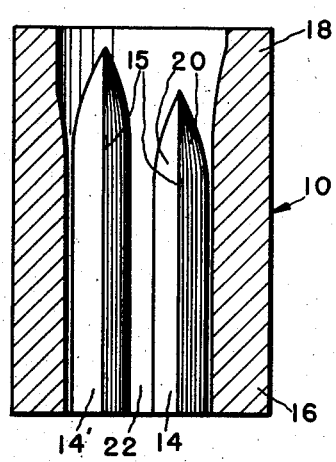
Figure 4:
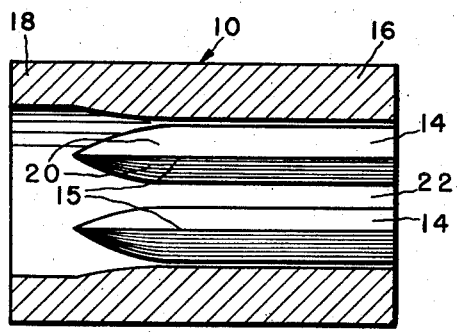

Other objects will become obvious from the specification and drawings in which,

Figure 1 is a perspective view, partially cut away, of a preferred form of the socket, Figs. 2 and 3 are end views of the entry and discharge ends of the socket, respectively, Fig. 4 is a cross-sectional view of Fig. 2 taken along the line 4—4 looking in the direction of the arrows, and Fig. 5 is a longitudinal cross section of a modification of the invention shown in Fig. 1.

Referring to the drawings, the socket is shown as comprising a tubular member 10 having a central longitudinal bore 12 extending therethrough for the passage of a nut or other element to be rotated by the socket. The bore 12 is of substantially uniform diameter throughout its length, and longitudinally positioned in spaced relation around the periphery of the bore is a plurality of ribs 14 that serve to engage flats on a nut so that the nut is rotatable by the socket. These ribs 14 are triangular in cross section with the base portion of the triangle positioned on the periphery of the bore so that the peak or point 15 of the triangle points radially inward. The position of a nut at the discharge end 16 of the socket is shown by the phantom lines in Fig. 3. It will be noted that the maximum radial dimension A of the nut is slightly less than the diameter of the bore 12 so that the nut can pass freely through the bore.

This socket may be used with machines of the type shown in my co-pending application Serial No. 677,287, filed August 9, 1957, in which bolts are forceably fed through the socket. One difficulty associated with a socket of this type is that the nut or bolt has a tendency to bind or hang up on the inlet ends of the ribs 14 in passing from the entry end 18 of the the socket toward the discharge end 16 thereof. This disadvantage is avoided in the present invention by terminating the inlet ends of the ribs 14 at substantially the same transverse plane of the socket and at points spaced from the inlet end of the member 10. Moreover, the inlet-end portions of each rib is tapered both in width and in heighth such that the side surfaces 20 of the inlet-end portions of the ribs are inclined in both a radial direction (i. e., in a direction from the point of the triangle toward the periphery of the bore) and a longitudinal direction (i. e. for the point of the rib along the base thereof to its maximum width). Thus when the corner of a nut strikes this surface, it is gradually guided inwardly and rotated to position the corner of the nut in the valley 22 between the ribs, or in other words, into the position shown in Fig. 3.

In another form of the invention, one of the ribs 14' is formed such that the leading or entry end thereof extends beyond the other ribs 14, as shown in Fig. 5. Experience has shown that this construction also aids in the proper positioning of the nut in the socket—that is with only one rib striking the nut as it moves into the socket, the nut cannot bind against another rib and is rotated to find the position shown in Fig. 3.

I claim:

1. A feed-through socket for nuts, bolts and the like comprising, a member having a circular longitudinal bore therethrough for the passage of such nuts, bolts or the like, inwardly extending ribs spaced around the periphery of the bore of said member, each of said ribs being tapered at its entry-end portion so as to decrease in size toward the entry end of said bore.

2. A feed-through socket for nuts, bolts and the like, comprising a tubular member adapted to receive and pass therethrough such nuts, bolts and the like, inwardly extending ribs spaced around the periphery of the bore of said member, each of said ribs being tapered at its entry-end portion so as to decrease in size toward the receiving end of the member, said ribs being triangular shaped in cross section with the base portion of the triangle positioned at the periphery of the bore.

3. The socket claimed in claim 2 in which the tapered end portion of each rib is tapered both in width and in heighth.

4. The socket claimed in claim 3 in which the tapered end portion of each rib is spaced from the receiving end of said member and extends longitudinally therefrom to the opposite end of said member.

5. A feed-through socket for nuts, bolts and the like comprising, a member having a circular longitudinal bore therethrough for the passage of such nuts, bolts or the like, inwardly extending ribs spaced around the periphery of the bore of said member, each of said ribs being tapered at its entry-end portion so as to decrease in size toward the entry end of said bore, and one of said ribs extending beyond the other ribs in the direction of said entry end of the bore.

References Cited in the file of this patent

UNITED STATES PATENTS 2,575,525     Mitchell _____ Nov. 20, 1951

FOREIGN PATENTS 290,392     Switzerland _____ Aug. 1, 1953
434,063     Great Britain _____ Aug. 26, 1935